United States Patent
Gniadek et al.

(10) Patent No.: US 12,299,706 B2
(45) Date of Patent: May 13, 2025

(54) INCENTIVIZATION OF OPTIMAL BLOOD DONATION FREQUENCY

(71) Applicant: Fenwal, Inc., Lake Zurich, IL (US)

(72) Inventors: Thomas Gniadek, Deerfield, IL (US); Kyungyoon Min, Kildeer, IL (US)

(73) Assignee: Fenwal, Inc., Lake Zurich, IL (US)

( * ) Notice: Subject to any disclaimer, the term of this patent is extended or adjusted under 35 U.S.C. 154(b) by 0 days.

(21) Appl. No.: 18/235,425

(22) Filed: Aug. 18, 2023

(65) Prior Publication Data

US 2024/0062233 A1 Feb. 22, 2024

Related U.S. Application Data

(60) Provisional application No. 63/399,464, filed on Aug. 19, 2022.

(51) Int. Cl.
*G06Q 30/02* (2023.01)
*G06Q 30/0208* (2023.01)

(52) U.S. Cl.
CPC ................................ *G06Q 30/0208* (2013.01)

(58) Field of Classification Search
CPC ........ G06Q 30/0208; G06Q 30/0207–30/0277
See application file for complete search history.

(56) References Cited

U.S. PATENT DOCUMENTS

| | | | |
|---|---|---|---|
| 5,194,145 A | 3/1993 | Schoendorfer | |
| 5,234,608 A | 8/1993 | Duff | |
| 11,392,908 B2 * | 7/2022 | Cuan | G06Q 20/4016 |
| 2005/0209522 A1 * | 9/2005 | Tadokoro | A61B 5/0245 604/66 |
| 2007/0219826 A1 * | 9/2007 | Brodsky | G06Q 10/00 705/2 |
| 2012/0038651 A1 * | 2/2012 | Case | G06Q 10/087 345/440 |
| 2013/0253969 A1 * | 9/2013 | Das | G06Q 10/06 705/7.13 |
| 2014/0126788 A1 * | 5/2014 | Satish | A61M 1/024 382/128 |
| 2014/0278499 A1 * | 9/2014 | Bowman | G06Q 30/0601 705/2 |
| 2016/0247181 A1 * | 8/2016 | Rogers | G06Q 30/0215 |
| 2016/0328521 A1 * | 11/2016 | Mickles | G16H 10/60 |
| 2018/0039748 A1 * | 2/2018 | Case | G06Q 10/087 |

(Continued)

FOREIGN PATENT DOCUMENTS

WO    WO 2012/125457 A1    9/2012

*Primary Examiner* — Thuy N Nguyen
(74) *Attorney, Agent, or Firm* — Cook Alex Ltd.

(57) ABSTRACT

Blood donation frequency is optimized by incentive structures uniquely tailored to individual blood donors. An incentive structure may include incentive offers of different values, with each value being based at least in part on the predicted quality of a blood product produced from blood donated by the donor on a particular date. The structure may alternatively or additionally include one or more incentive offers that are each valued based at least in part on the predicted likelihood of the donor having an adverse reaction to a blood donation occurring on a particular date. The structure may alternatively or additionally include one or more incentive offers that are each valued based at least in part on the predicted likelihood of an attempted blood donation by the target donor being deferred on a particular date.

20 Claims, 7 Drawing Sheets

(56) References Cited

U.S. PATENT DOCUMENTS

| | | | | |
|---|---|---|---|---|
| 2018/0252733 | A1* | 9/2018 | Zimring | G01N 33/49 |
| 2018/0294055 | A1* | 10/2018 | Hazzazi | G06Q 10/0633 |
| 2021/0055312 | A1* | 2/2021 | Huber | G01N 33/54366 |
| 2021/0379268 | A1* | 12/2021 | Levine | A61M 1/3687 |
| 2022/0058677 | A1* | 2/2022 | Edwards | G06N 5/04 |
| 2022/0262506 | A1* | 8/2022 | Case | G16H 40/40 |
| 2022/0351851 | A1* | 11/2022 | Case | G06T 11/206 |

* cited by examiner

| Sunday | Monday | Tuesday | Wednesday | Thursday | Friday | Saturday |
|---|---|---|---|---|---|---|
| N/A | $50 | $50 | $75 | $75 | $100 | N/A |

| Sunday | Monday | Tuesday | Wednesday | Thursday | Friday | Saturday |
|---|---|---|---|---|---|---|
| N/A | $50 | $50 | $75 | $50 | $100 | N/A |

INCENTIVIZATION OF OPTIMAL BLOOD DONATION FREQUENCY

CROSS-REFERENCE TO RELATED APPLICATIONS

This application claims the benefit of and priority of U.S. Provisional Patent Application Ser. No. 63/399,464, filed Aug. 19, 2022, the contents of which are incorporated by reference herein.

BACKGROUND

Field of the Disclosure

The present disclosure relates to blood donation. More particularly, the present disclosure relates to optimization of blood donation frequency via implementation of incentive structures uniquely tailored to individual blood donors.

Description of Related Art

Donation of whole blood and individual blood components (e.g., plasma, platelets, and red blood cells) is important for maintaining the supply required for transfer and/or therapeutic treatment. However, donors may choose to donate on a schedule that is not ideal in a variety of ways. For example, a donor may attempt to make a donation on a date when their blood is not in optimal condition, on a date when the donor is more likely to have an adverse reaction to donation, or on a date when the donor is more likely to have an attempted donation be deferred. Accordingly, it would be advantageous to provide systems and methods for incentivizing donation on a more optimal schedule or at a more preferable frequency.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a computer-based method is provided for incentivizing blood donation. The method includes predicting the quality of a blood product produced from blood donated by a target donor on each of a plurality of dates, generating an incentive offer for the target donor to donate blood on at least one of said dates, and transmitting the incentive offer to the target donor, with the magnitude of each incentive offer depending at least in part on the predicted quality of the blood product produced from blood donated by the target donor on the corresponding date.

In another aspect, a computer-based method for incentivizing blood donation includes predicting the likelihood of a target donor experiencing an adverse reaction to a blood donation on each of a plurality of dates, generating an incentive offer for the target donor to donate blood on at least one of said dates, and transmitting the incentive offer to the target donor, with the magnitude of each incentive offer depending at least in part on the predicted likelihood of the adverse reaction occurring on the corresponding date.

In yet another aspect, a computer-based method for incentivizing blood donation includes predicting the likelihood of an attempted blood donation by a target donor being deferred on each of a plurality of dates, generating an incentive offer for the target donor to donate blood on at least one of said dates, and transmitting the incentive offer to the target donor, with the magnitude of each incentive offer depending at least in part on the predicted likelihood of the deferral occurring on the corresponding date.

DESCRIPTION OF THE ILLUSTRATED EMBODIMENTS

The embodiments disclosed herein are for the purpose of providing an exemplary description of the present subject matter. They are, however, only exemplary, and the present subject matter may be embodied in various forms. Therefore, specific details disclosed herein are not to be interpreted as limiting the subject matter as defined in the accompanying claims.

According to an aspect of the present disclosure, systems and methods are provided for incentivizing blood donation so as to achieve any of a number of goals. For example, systems and methods according to the present disclosure may be employed to improve the quality of a blood product produced from blood of a particular blood donor. Systems and methods according to the present disclosure may also (or alternatively) be employed to reduce the likelihood of a donor having an adverse reaction when donating blood and/or the likelihood of an attempted donation being deferred.

It should be understood that the term "blood donation" refers to a variety of procedures in which blood or a blood component is drawn from a donor and retained. For example, the term "blood donation" is intended to encompass donation of whole blood, donation of plasma, donation of red blood cells, and donation of platelets. For procedures in which only a blood fraction is retained, the other blood components are returned to the donor (sometimes along with a replacement fluid, such as saline), which may allow for more frequent donations than when whole blood is donated. For example, eight weeks may be required after a donation before a subsequent whole blood donation may be made, whereas donation of plasma may require only four weeks and donation of platelets may require a one-week recovery time, on account of the body of the donor being able to recover more quickly and return to a condition that is suitable for a subsequent donation when only a fraction of the donor's blood is retained.

Figure 1:
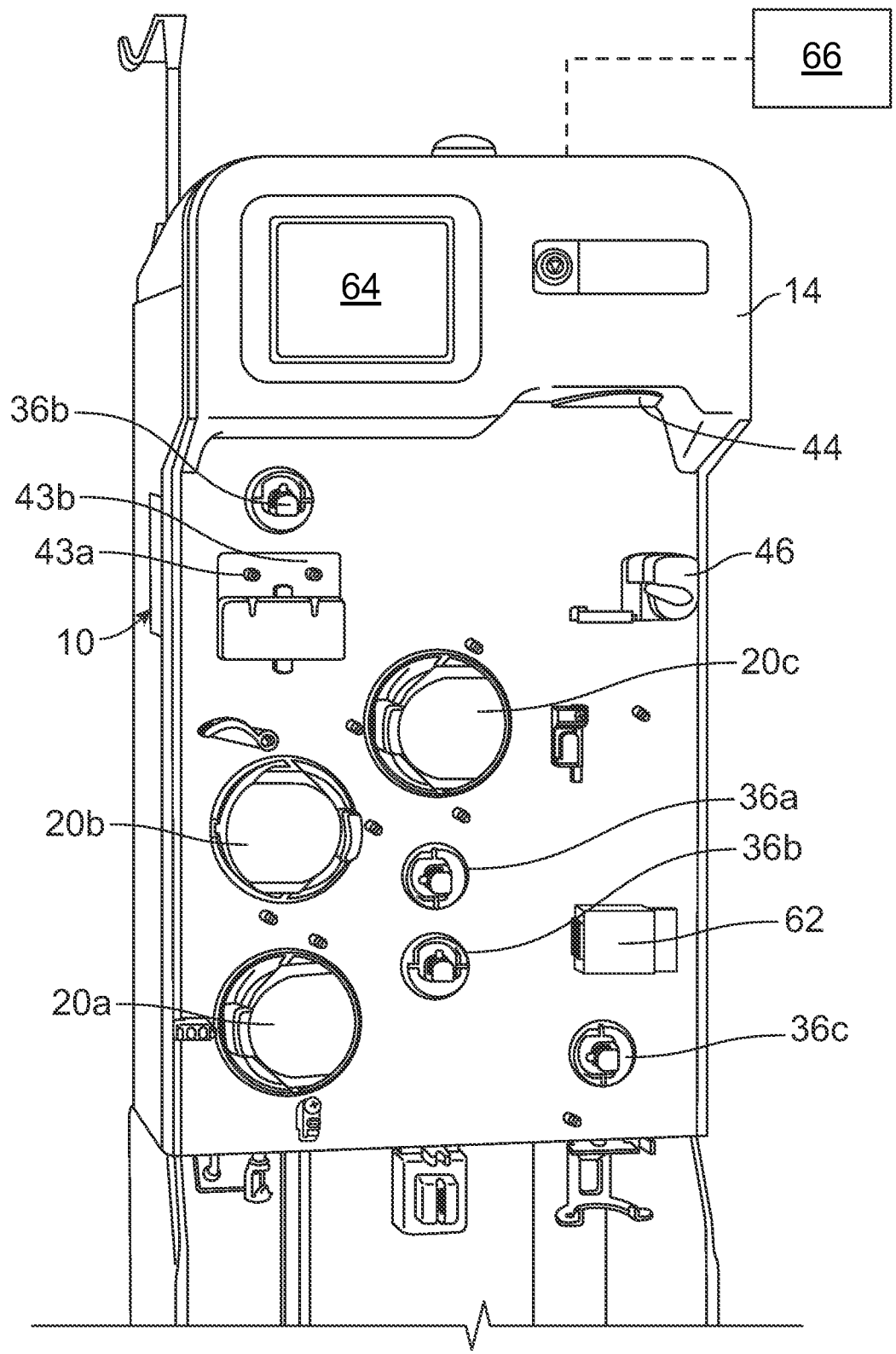
FIG. 1 is a front perspective view of an exemplary blood separation device.
Figure 2:
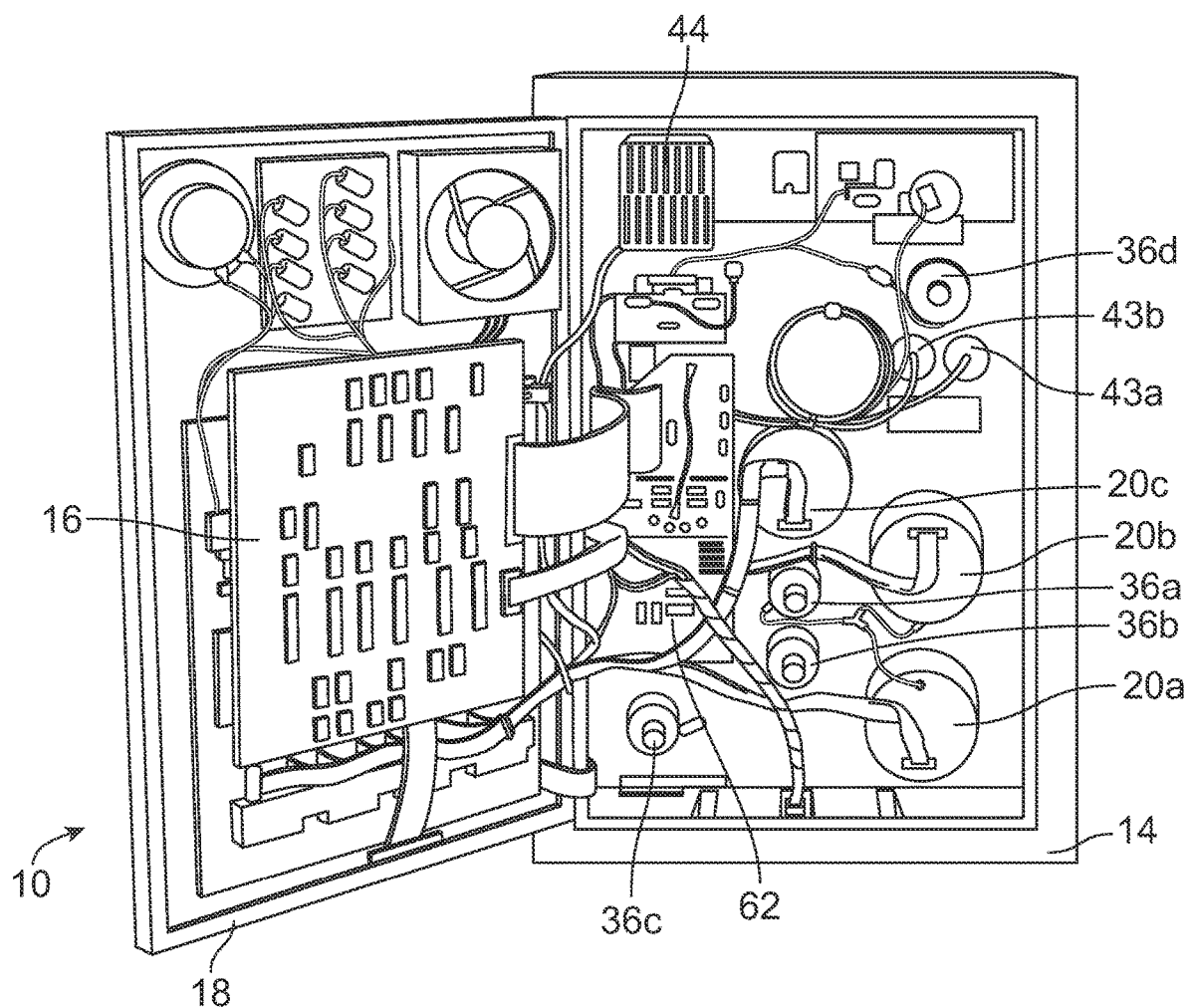
FIG. 2 is a rear perspective view of the blood separation device of FIG. 1, with a rear door thereof in an open position.
Figure 3:
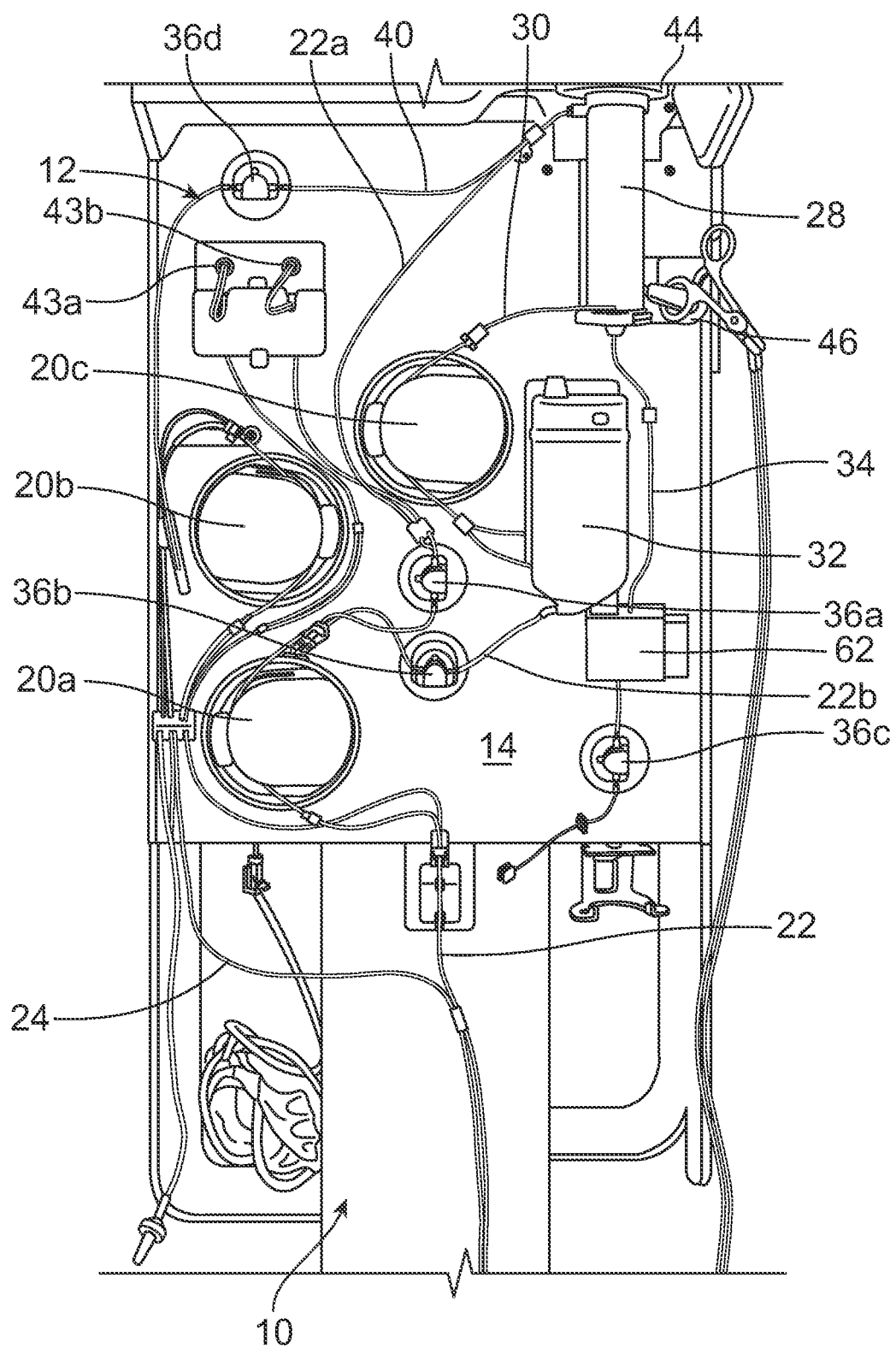
FIG. 3 is a front perspective view of the blood separation device of FIG. 1, with a fluid flow circuit associated therewith to constitute a blood separation system.
Figure 5:
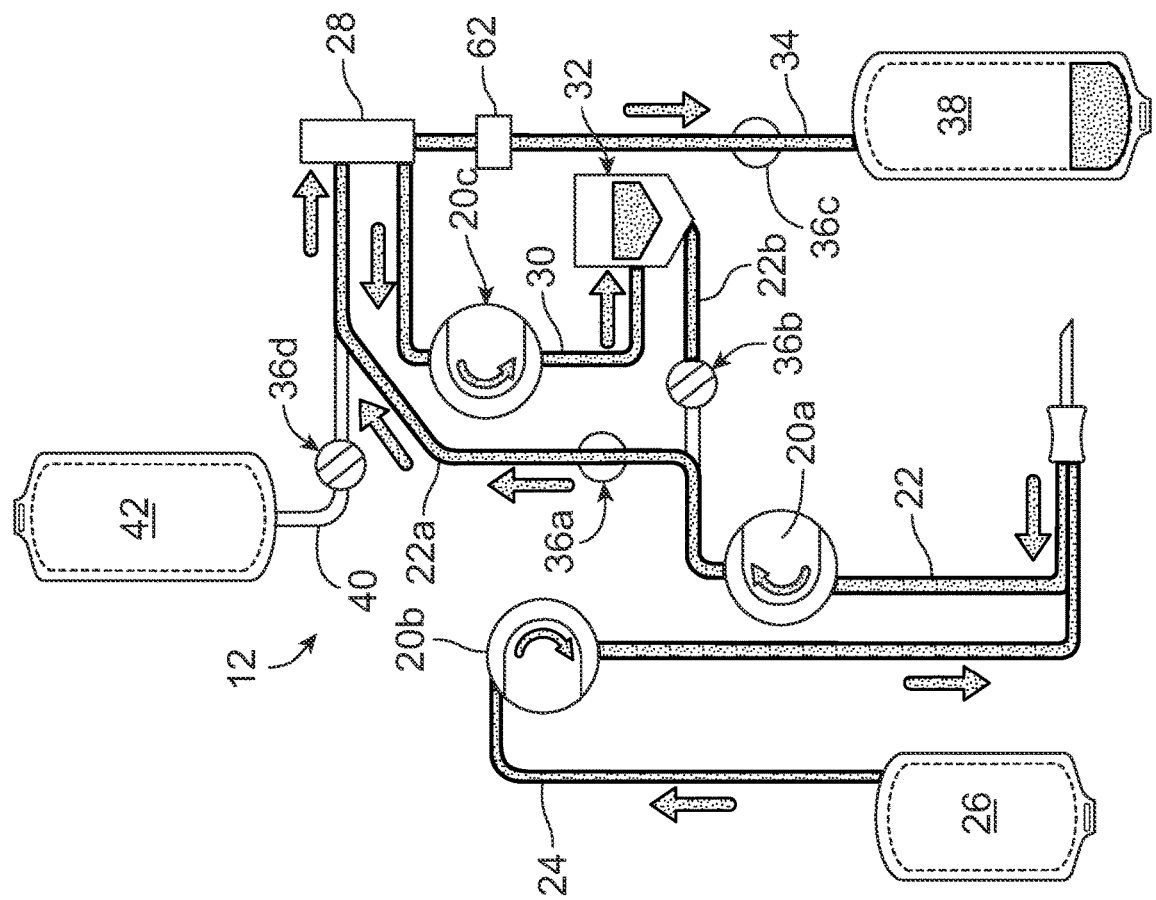
FIG. 5 is a schematic view of the blood separation system of FIG. 3, in a blood draw mode.
Figure 4:
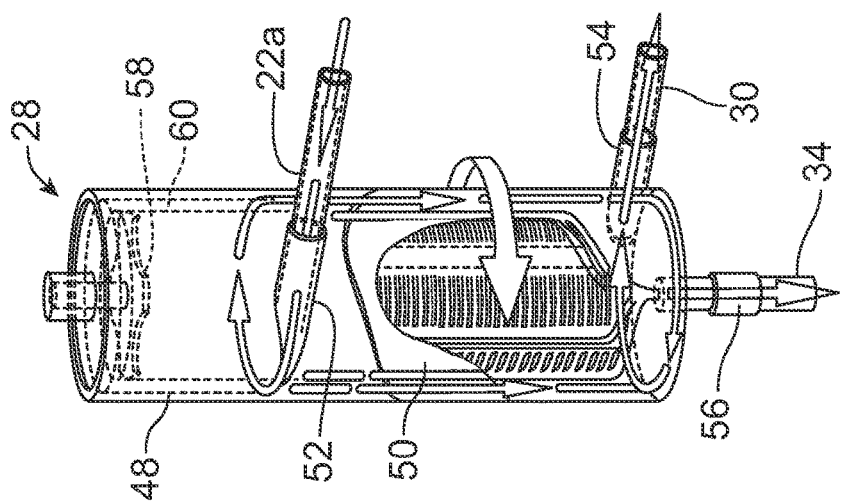
FIG. 4 is a front perspective view of a blood separation chamber of the fluid flow circuit of FIG. 3, with a portion thereof broken away for illustrative purposes.

As a variety of blood donation procedures are encompassed by the disclosure of the present application, it should be understood that a variety of blood donation devices/systems and techniques may be employed without departing from the scope of the present disclosure. By way of example, FIGS. 1-7 illustrate a blood separation device 10 that is marketed as the AURORA® separator from Fenwal, Inc. of Lake Zurich, Illinois, which is an affiliate of Fresenius Kabi AG of Bad Homburg, Germany. This device 10, which is particularly well-suited for plasma donations, is used in combination with a separate fluid flow circuit (which may be disposable) to separate blood into two or more constituents. FIGS. 1 and 2 illustrate the device 10, while FIG. 3 illustrates an exemplary fluid flow circuit 12 mounted onto the blood separation device 10, with the combination referred to herein as a "blood separation system".

The illustrated device 10 includes a cabinet or housing 14, with several components positioned outside of the cabinet 14 (e.g., associated with a front wall or surface or panel of the cabinet 14) and additional components (including a central processing unit or controller 16) and interconnects positioned inside of the cabinet 14, which may be accessed by opening a rear door 18 of the device 10, as shown in FIG. 2. Among the components positioned on the outside of the cabinet 14, one or more pumps or pump stations 20a-20c (collectively referred to herein as a "pump system") may be provided, with the pumps 20a-20c configured to accommodate tubing lines of the fluid flow circuit 12. One of the pumps 20a may be provided as a donor access pump, which may be associated with a donor access line 22 of the fluid flow circuit 12 and operates to draw blood from a donor (FIG. 5) and to return fluid to the donor (FIGS. 6 and 7). Another one of the pumps 20b may be provided as an anticoagulant pump, which may be associated with an anticoagulant line 24 of the fluid flow circuit 12 and operates to add anticoagulant from an anticoagulant source or container 26 of the fluid flow circuit 12 (FIG. 5) to blood drawn from the donor in the donor access line 22 before the blood enters into a blood separation module or chamber 28 of the fluid flow circuit 12. A third pump 20c may be provided as a blood cell pump, which may be associated with a blood cell outlet line 30 and operates to draw cellular blood components from the blood separation chamber 28 and direct them into a blood cell reservoir 32 after the blood has been separated into a cellular components and separated plasma in the blood separation chamber 28.

In addition to the pumps 20a-20c, the external components of the device 10 may include one or more clamps or valves 36a-36d (collectively referred to herein as a "clamp system") associated with the tubing lines of the fluid flow circuit 12. The clamps or valves 36a-36d may be variously configured and operate to selectively allow or prevent fluid flow through the associated tubing line. In the illustrated embodiment, one clamp or valve 36a may be provided as a donor clamp, which may be associated with a draw branch 22a of the donor access line 22 of the fluid flow circuit 12 to allow (FIG. 5) or prevent (FIGS. 6 and 7) the flow of blood through the draw branch 22a of the donor access line 22. Another one of the clamps or valves 36b may be provided as a reinfusion clamp or valve, which may be associated with a reinfusion branch 22b of the donor access line 22 downstream of the blood cell reservoir 32 of the fluid flow circuit 12 to allow (FIGS. 6 and 7) or prevent (FIG. 5) the flow of cellular blood components through the reinfusion branch 22b. A third clamp or valve 36c may be provided as a plasma clamp or valve, which may be associated with the plasma outlet line 34 to allow (FIG. 5) or prevent (FIGS. 6 and 7) the flow of separated plasma through the plasma outlet line 34 and into a separated plasma container 38. A fourth clamp or valve 36d may be provided as a replacement fluid clamp or valve, which may be associated with a replacement fluid line 40 of the fluid flow circuit 12 to allow (FIG. 7) or prevent (FIGS. 5 and 6) the flow of a replacement fluid out of a replacement fluid source 42 (e.g., a bag or container at least partially filled with saline). Additional or alternative clamps or valves may also be provided.

The illustrated device 10 further includes one or more pressure sensors 43a and 43b that may be associated with the fluid flow circuit 12 to monitor the pressure within one or more of the tubing lines of the fluid flow circuit 12 during operation of the pumps 20a-20c and clamps or valves 36a-36d. In one embodiment, one pressure sensor 43a may be associated with a tubing line that draws blood from a donor and/or directs separated blood components to the donor, while the other pressure sensor 43b may be associated with a tubing line that directs fluid into or out of the blood separation chamber 28 to assess the pressure within the blood separation chamber 28, but the pressure sensors 43a and 43b may also be associated with other tubing lines without departing from the scope of the present disclosure. The pressure sensors 43a and 43b may send signals to the system controller 16 that are indicative of the pressure within the tubing line or lines being monitored by the pressure sensor 43a, 43b. If the controller 16 determines that an improper pressure is present within the fluid flow circuit 12 (e.g., a high pressure due to an occlusion of one of the tubing lines), then the controller 16 may instruct one or more of the pumps 20a-20c and/or one or more of the clamps or valves 36a-36d to act so as to alleviate the improper pressure condition (e.g., by reversing the direction of operation of one of the pumps 20a-20c and/or opening or closing one of the clamps or valves 36a-36d). Additional or alternative pressure sensors may also be provided.

The device 10 also includes a separation actuator 44 that interacts with a portion of the blood separation chamber 28 to operate the blood separation chamber 28. A chamber lock 46 may also be provided to hold the blood separation chamber 28 in place with respect to the cabinet 14 and in engagement with the separation actuator 44. The configuration and operation of the separation actuator 44 depends upon the configuration of the blood separation chamber 28. In the illustrated embodiment, the blood separation chamber 28 is provided as a spinning membrane-type separator, such as a separator of the type described in greater detail in U.S. Pat. Nos. 5,194,145 and 5,234,608 or in POT Patent Application Publication No. WO 2012/125457 A1, all of which are hereby incorporated herein by reference. If provided as a spinning membrane-type separator, the blood separation chamber 28 may include a tubular housing 48 (FIG. 4), with a microporous membrane 50 positioned therein. An inlet 52 allows blood to enter into the housing 48 (via the draw branch 22a of the donor access line 22), while a side outlet 54 allows cellular blood components to exit the housing 48

(via the blood cell outlet line 30) and a bottom outlet 56 allows separated plasma to exit the housing 48 (via the plasma outlet line 34) after the blood has been separated into cellular blood components and plasma.

In the illustrated embodiment, the separation actuator 44 is provided as a driver that is magnetically coupled to a rotor 58 on which the membrane 50 is mounted, with the separation actuator 44 causing the rotor 58 and membrane 50 to rotate about the central axis of the housing 48. The rotating rotor 58 and membrane 50 create Taylor vortices within a gap 60 between the housing 48 and the membrane 50, which tend to transport the cellular blood components away from the membrane 50 to exit the blood separation chamber 28 via the side outlet 54, while the separated plasma passes through the membrane 50 toward the central axis of the housing 48 to exit the blood separation chamber 28 via the bottom outlet 56, It should be understood that the present disclosure is not limited to a particular blood separation chamber and that the illustrated and described blood separation chamber 28 is merely exemplary. For example, a centrifugal device that separates blood components based on density, rather than size, may be employed to separate blood into its constituents.

The device 10 may include alternative and/or additional components, such as a hemoglobin detector or optical sensor assembly 62 associated with the plasma outlet line 34, a blood cell weigh scale associated with the reservoir 32, and a plasma weight scale associated with the separated plasma container 38 of the fluid flow circuit 12. The illustrated device 10 also includes a data entry device 64 configured as a touch screen for inputting information into the controller 16 (e.g., characteristics or demographic information of a donor) and displaying the input information or information originating from the controller 16. For example, blood from a donor may be sampled before a donation is given, with various characteristics of the blood (e.g., pre-donation platelet count, hemoglobin, and/or plasma protein concentration) being recorded and entered by an operator using the data entry device 64 or displayed by the controller 16 on the data entry device 64. Taking a sample of blood before donation begins may be advantageous to the extent that the controller 16 may use the information to predict the potential quality of one or more products produced using blood from the donation.

Figure 6:
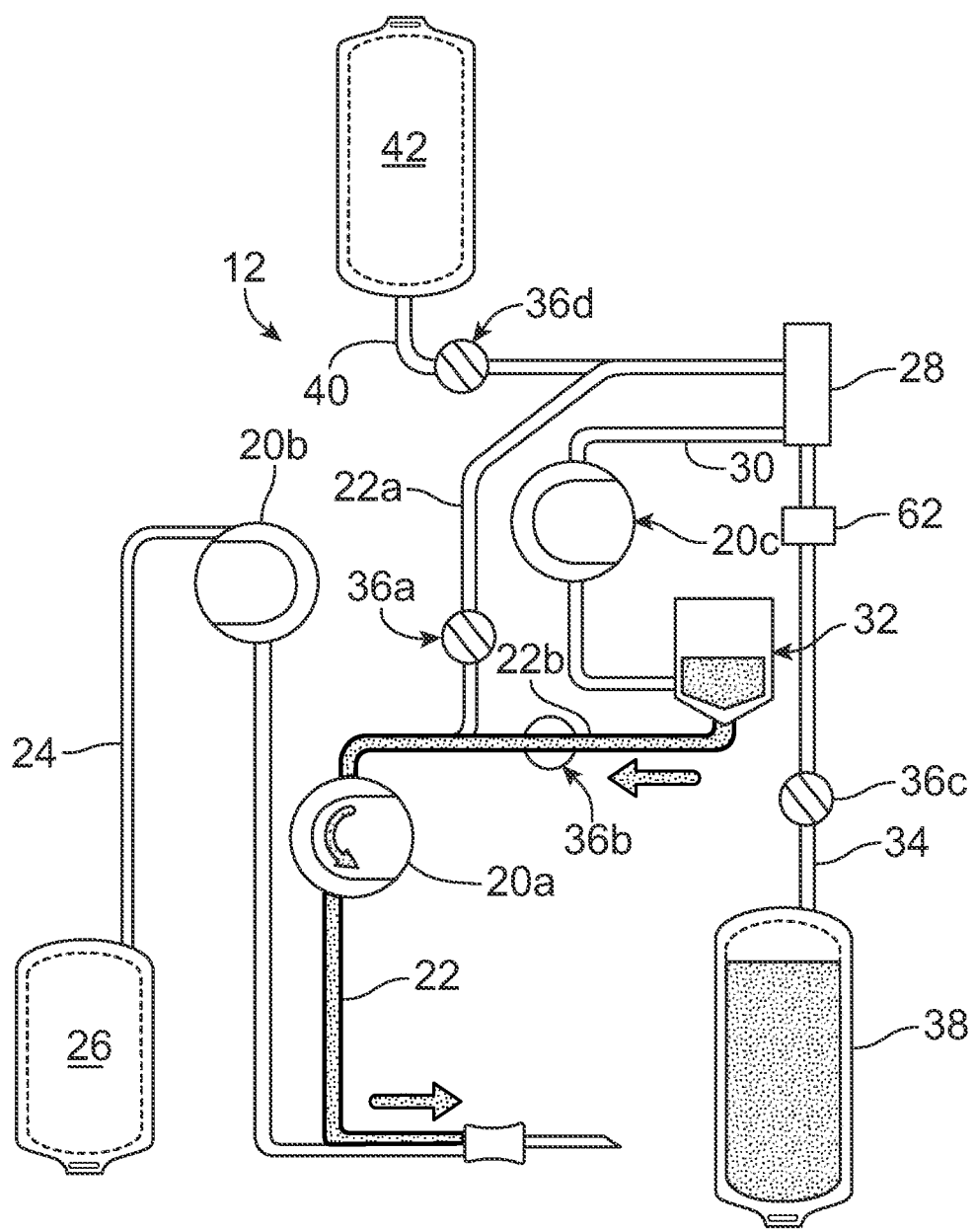
FIG. 6 is a schematic view of the blood separation system of FIG. 3, in a blood component return mode.

According to one method of using the illustrated blood separation system, blood is drawn from a donor into the blood separation chamber 28 during a draw phase or mode (FIG. 5), where it is separated into cellular blood components and separated plasma. The separated plasma is retained by the device 10 (e.g., within the separated plasma container 38 of the fluid flow circuit 12), while the blood cells are returned to the donor during a return or reinfusion phase or mode (FIG. 6). In one embodiment, the draw and return phases are repeatedly alternated (drawing from the donor, separating the blood into plasma and blood cells, and then returning the blood cells to the donor) until a target (e.g., a collected amount of separated plasma) is achieved. AH of the draw phases and all of the return phases may be identical or may differ from each other. For example, a final draw phase may draw less blood from the donor than the previous draw phases and a final return phase may infuse a combination of blood cells and replacement fluid to the donor, whereas the previous return phases return only blood cells to the donor.

Figure 7:
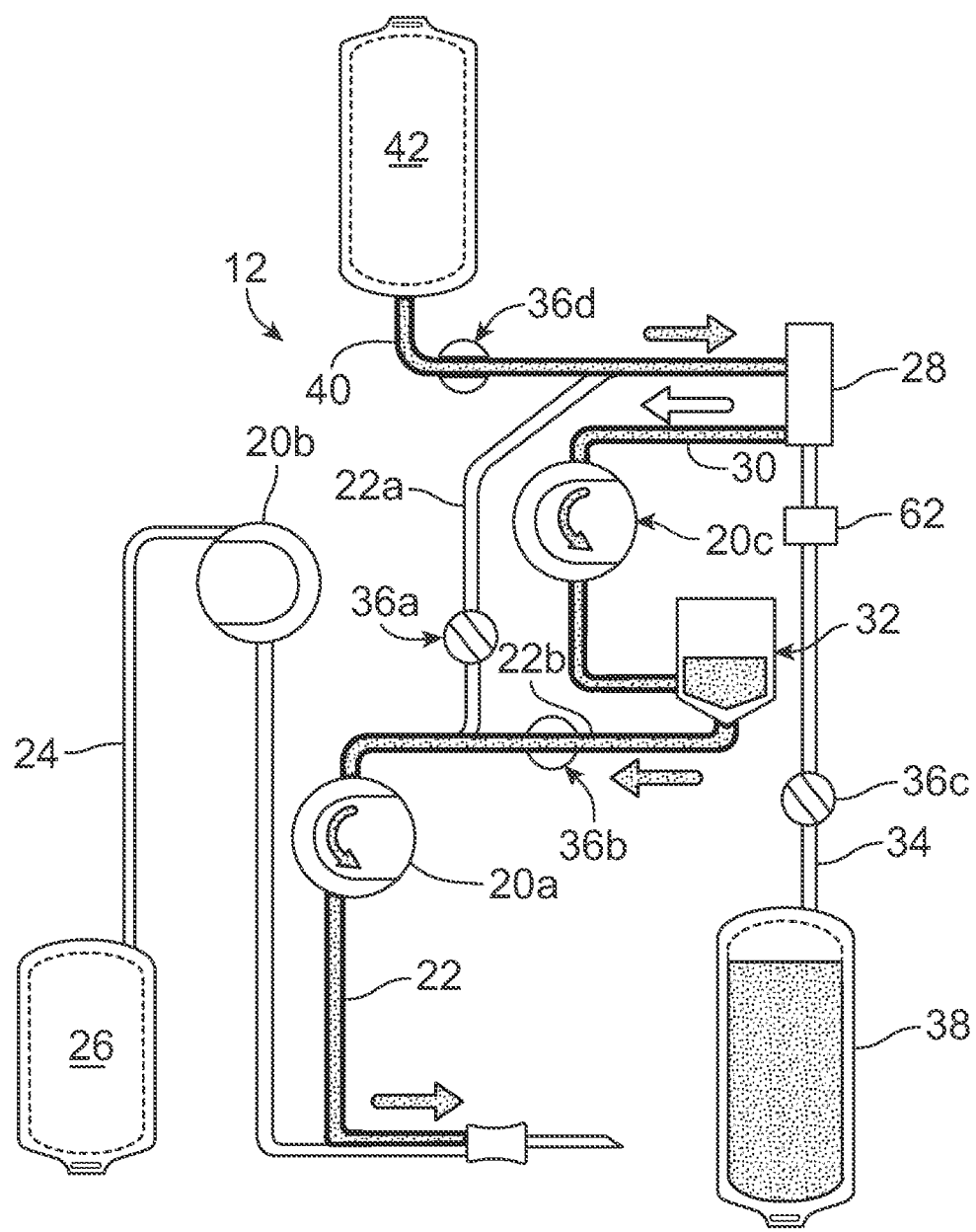
FIG. 7 is a schematic view of the fluid flow circuit and fluid processing system of FIG. 3, in a replacement fluid return mode.

FIG. 7 shows an exemplary phase or mode in which replacement fluid (e.g., saline) is directed to the donor, either alone or with an amount of cellular blood components. In the phase of FIG. 7, the clamp or valve 36d associated with the replacement fluid line 40 is opened to allow replacement fluid to flow out of the replacement fluid source 42. The clamp or valve 36a associated with the draw branch 22a of the donor access line 22 may be in a closed condition to prevent fluid flow therethrough, such that the replacement fluid is directed into the blood separation chamber 28. The replacement fluid is pulled out of the blood separation chamber 28 and into the blood cell reservoir 32 by operation of the pump 20c associated with the blood cell outlet line 30. If there are any cellular blood components in the blood cell reservoir 32, then the replacement fluid mixes with the blood cells prior to being pumped to the donor by the pump 20a associated with the donor access line 22, otherwise the replacement fluid alone may be pumped to the donor. In one embodiment, the replacement fluid return mode of FIG. 7 is carried out only once, as a final return phase (e.g., when the amount of cellular blood components in the blood cell reservoir 32 is at a sufficiently low level) in which a mixture of blood cells and replacement fluid is returned to the donor. This may be advantageous to ensure that all of the blood cells in the blood cell reservoir 32 (along with any remaining in the blood separation chamber 28) are rinsed out of the blood cell reservoir 32 and pumped to the donor.

In other embodiments, the replacement fluid return mode of FIG. 7 may be carried out at other times, such as earner in the procedure, at multiple scheduled times during a procedure, and/or at any time upon a request from the operator and/or using a different path between the replacement fluid source 42 and the donor. For example, it may be advantageous for the replacement fluid to bypass the blood separation chamber 28 and the blood cell reservoir 32 if the replacement fluid is being pumped to a donor earlier in the procedure. In this case, the clamp or valve 36d associated with the replacement fluid line 40 and the clamp or valve 36a associated with the draw branch 22a of the donor access line 22 may be opened to allow fluid flow therethrough, with the clamp or valve 36b associated with the reinfusion branch 22b in a closed condition to prevent fluid flow therethrough. The pump 20a associated with the donor access line 22 may be activated (with the other two pumps 20b and 20c inactive) to draw replacement fluid out of the replacement fluid source 42 and through the replacement fluid line 40, the draw branch 22a, and finally the donor access line 22 to the donor.

It is again emphasized that the blood separation device 10 of FIGS. 1-7 is merely exemplary and that other blood separation devices may be employed in executing blood donations incentivized by the approaches described herein. Additionally, it should be understood that an automated blood separation device is not required to execute a blood donation incentivized by the approaches described herein, but rather the concepts described herein may be practiced in combination with any device or system that is configured to draw blood from a blood donor.

Figures 8, 9, 10:
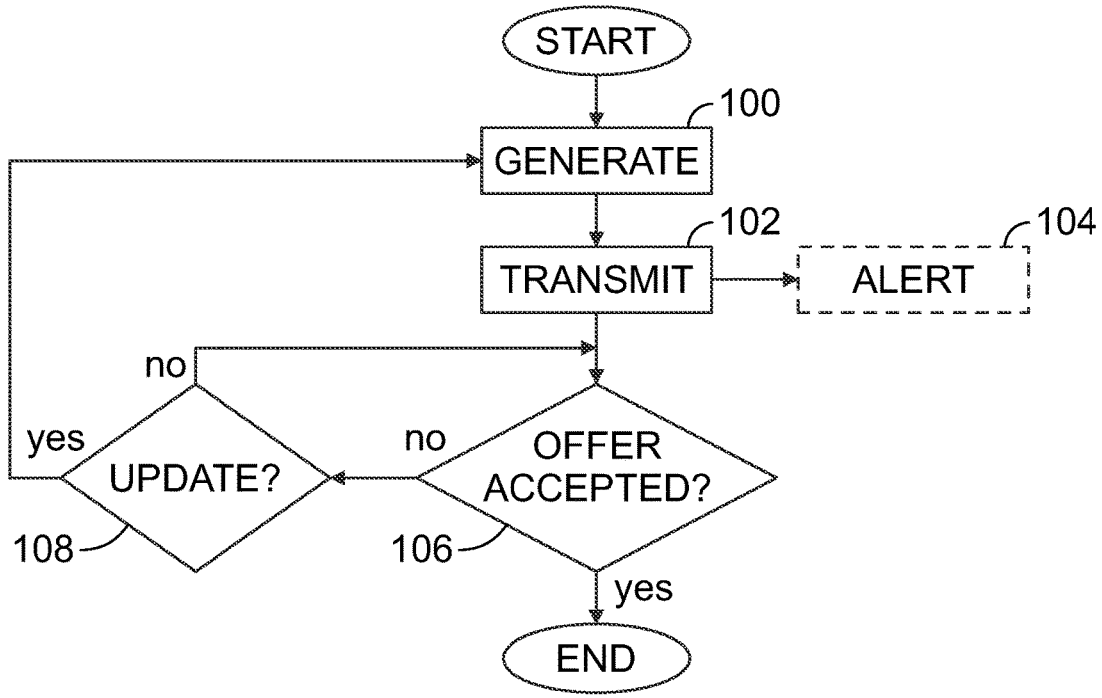
FIG. 8 is a flowchart showing a blood donation optimization routine according to an aspect of the present disclosure.
FIG. 9 illustrates an exemplary blood donation incentive program according to an aspect of the present disclosure.
FIG. 10 illustrates a modified version of the blood donation incentive program of FIG. 9.

Turning now more particularly to a blood donation incentivization approach, FIG. 8 illustrates an exemplary blood donation optimization routine executed by a computer 66 (FIG. 1) according to an aspect of the present disclosure. An incentive offer is generated by the computer 66 at step 100, The incentive may be a monetary payment to be made to a donor for donating blood on a particular date or any other incentive that is calculated to induce a donor to donate blood on a particular date. The magnitude of the incentive offer assigned to each of a plurality of dates by the computer 66 may depend on any of a number of factors without departing from the scope of the present disclosure. The factors may include the value of the collected blood or blood component to the collector or blood donation facility (i.e., the market value), the cost of executing a blood donation procedure, and the relative value of a target donor with respect to other prospective donors.

The incentive offer is then transmitted by the computer 66 to a target donor in step 102. The incentive offer may be transmitted to the target donor by any suitable means, including (but not limited to) an email or text message, a telephone call, a smart device application (i.e., an "app"), and/or mail.

The computer 66 may optionally alert the target donor (or otherwise cause the donor to be alerted) that the incentive offer has been transmitted, as indicated in FIG. 8 at step 104. The donor may be alerted when any incentive offer has been transmitted or may be alerted at predetermined times. For example, a target donor may be alerted once a week to notify them that incentive offers for donating blood are available to them. In another example, a donor may choose to be alerted whenever an incentive offer having a value exceeding a minimum threshold has been made available to them. Any other approach to alerting a target donor upon the transmission of an incentive offer may be employed without departing from the scope of the present disclosure.

FIG. 9 illustrates an exemplary incentive offer structure 200 that may be generated by a computer 66 executing the routine of FIG. 8. An incentive offer is assigned to one or more dates by the computer 66, with FIG. 9 showing incentive offers assigned to the days of one week. In the illustrated example, blood donation is not available on certain days of the week, with the incentive offer structure 200 identifying these dates as "N/A" (because an incentive for donating blood on those dates is not available). These may include dates on which an individual donor is not eligible for donating blood (e.g., because the date is too soon after the most recent blood donation that was made by the donor).

On those days when blood donations may be made, an incentive is assigned by the computer 66. As shown in FIG. 9, at least two of the incentives may be different, which is intended to encourage the target donor to donate blood on a schedule that is preferred by the collector or blood donation facility. For example, in FIG. 9, an incentive of $50 is offered for donating blood on Monday or Tuesday, an incentive of $75 is offered for donating blood on Wednesday or Thursday, and an incentive of $100 is offered for donating blood on Friday. According to this illustrated example, it is most preferred by the collector or blood donation facility for the donor to donate blood on Friday, with Monday and Tuesday being least preferred and Wednesday and Thursday being somewhat preferred. By offering an incentive offer having the greatest value or magnitude for a donation made on Friday, the target donor is encouraged to donate blood on that date, as opposed to a date that is less preferred (which dates have associated incentive offers of lesser value or magnitude).

Once the incentive offer has been transmitted, the target donor has the option of accepting the offer (as shown in FIG. 8 at step 106). The offer may be accepted in any suitable form, which may include the target donor notifying the computer 66 or an agent of the collector or blood donation facility (e.g., a data-entry personnel that notifies the computer 66 that an incentive offer has been accepted). Alternatively, the target donor may accept the incentive offer by appearing at a blood donation site and having their blood drawn. Once the offer has been accepted, the donor may receive the incentive immediately or at a later time (e.g., after completing the agreed-upon blood donation). The computer 66 implementing the routine of FIG. 8 may update its records to indicate that the offer has been accepted by the target donor, which may be used as a basis for generating future incentive offers for the same donor and/or as a basis for modifying previously issued incentive offers for other target donors (as will be described in greater detail herein).

When an incentive offer has not yet been accepted by a target donor, the computer 66 will check to determine whether one or more of the previously issued incentive offers should be updated (as identified in FIG. 8 at step 108), It may be advantageous to update or modify or revise or replace a previously issued incentive offer for any of a variety of reasons. For example, if demand for blood donation on a particular date has changed since an incentive offer was issued, it may be appropriate for the computer 66 to change the incentive offer in response to reflect the new value placed by the collector or blood donation facility on a future blood donation. This may include increasing a previously issued incentive offer when demand for blood donation on a particular date has increased and decreasing a previously issued incentive offer when demand for blood donation on a particular date has decreased. Similarly, if the supply of blood or a blood component has changed since an incentive offer was issued, it may be appropriate for the computer 66 to change the value or magnitude of the incentive offer. This may include increasing a previously issued incentive offer when supply has decreased (e.g., if another donor has canceled an appointment to donate blood) and decreasing a previously issued incentive offer when supply has increased (e.g., if more donors than expected have scheduled appointments to donate blood). In other examples, it may be appropriate for a computer 66 to decrease the value or magnitude of a previously issued incentive offer for a particular date due to an intervening donation by a target donor and/or change the value or magnitude of a previously issued incentive offer for a particular date when the available staff or personnel at a donation site has changed (e.g., reducing an incentive offer when the available personnel has decreased and it has become less likely that a staff member will be available to oversee a blood donation by the target donor).

If there is no need to update any of the previously issued and currently active incentive offers, the computer 66 may proceed to execute a loop in which it periodically checks whether the target donor has accepted an offer (step 106) and then (if the offer has still not been accepted) checks whether the offer should be updated (step 108).

On the other hand, if the computer 66 determines that a previously issued and currently active incentive offer should be updated, it may return to step 100 to generate a revised or updated or replacement incentive offer and then transmit the new offer (step 102), followed by determining whether the new offer has been accepted (step 106) and/or whether the new offer should be further revised or updated or replaced (step 108). For example, FIG. 10 illustrates a modified version 300 of the incentive offer structure 200 of FIG. 9. Comparing the structures 200 and 300 of FIGS. 9 and 10, it will be seen that the only difference is that the incentive offer corresponding to a blood donation made on Thursday has changed by the computer 66 from $75 (FIG. 9) to $50 (FIG. 10). This change in the incentive offer structure may be motivated by any of a number of factors, as noted above.

The routine of FIG. 8 may continue until an incentive offer has been accepted or lapses (e.g., when the date associated with the incentive offer has passed).

As noted above, an incentive offer routine of the type shown in FIG. 8 may be executed to achieve any of a number of goals. The nature of the goal to be achieved may be a factor in generating individual incentive offers and multi-date incentive offer structures. For example, an incentive offer routine according to the present disclosure may be executed by a computer 66 to attempt to improve the quality of a blood product that may be produced using blood donated by a target donor on a particular date. The quality of a blood product may be assessed according to any suitable approach and the prediction of the quality of a blood product produced from blood donated on a particular date may be made by any suitable approach. For example, the quality of a plasma product may be judged based on its protein or IgG level, the quality of a red blood cell product may be judged based on hematocrit and/or hemoglobin levels, and the quality of a platelet product may be judged by platelet count (e.g., whether a single, double, or triple platelet product may be produced).

The quality of a blood product that may be produced may be best predicted by the computer 66 based on historical data for the target donor (i.e., previous blood donations). For example, when a donor has participated in a series of blood donations, the nature of the blood drawn from the donor and/or the nature of a blood product produced from the blood drawn for each donation may be determined and recorded by the computer 66. This historical data may be used to estimate how long it takes after a blood donation for the donor to be in condition to give a subsequent donation. This prediction may be adjusted for the nature of the donation, with more time for recovery being required for donation of whole blood (on the order of eight weeks) than is required for donation of plasma (on the order of one month), for example.

However, while historical data for a particular donor may be the best basis for predicting the quality of a blood product produced using blood from the donor that is donated on a future date, such historical data is not always available. In this situation, data from a larger population of blood donors (e.g., all of the donors at a particular blood draw site or geographical region, etc.) may be used to generate an initial prediction model and incentive offer structure for a particular donor. For example, data from a larger population of blood donors may indicate that an average whole blood donor requires eight weeks after a donation for their body to be in condition for a subsequent donation. In this case, the population data may be used by the computer 66 to create an initial incentive offer structure in which the donor is incentivized to donate blood eight weeks after an initial donation. Incentive offers of lower value may be employed for later dates (e.g., nine weeks after an initial donation) to encourage the donor to make a subsequent donation as soon as their body is predicted to be in condition for such a donation, rather than delaying the donation. If information has been recorded for a donor (e.g., age, weight, height, sex, ethnicity), that information may be used to refine the scope of the population used to predict the quality of a blood product, by limiting the population to those donor having characteristics that are similar to the subject donor.

Once a donor has completed a series of donations (which may be as few as two donations), the data collected for those donations may be used by the computer 66 to refine the prediction model and incentive offer structure for that particular donor. For example, when a donor has completed a first blood donation, the composition of their blood may be analyzed. After the donor has made a second blood donation, the data from the second donation may be used to assess whether the predicted recovery time based on the larger population of donors should be modified. This may include the predicted recovery time being shortened (if the available historical data for the target donor suggests that they require a shorter than average recovery time) or extended (if the available historical data for the target donor suggests that they require more recovery time than an average donor).

An incentive offer that is calculated to improve the quality of a blood product may include a correction factor if the target donor has a history of "cheating," As used in this context, the term "cheating" refers to a donor making a donation that is not recorded by the computer 66, such as at a facility or site that is not affiliated with the computer 66. In this case, the prediction and incentive offer structure generated by the computer 66 based on the information available to it will not be accurate because there has been an intervening donation by the target donor that is not known to the computer 66. When evidence of "cheating" is present in the historical data of the target donor, the computer 66 may apply any suitable correction factor to the algorithm it uses to predict blood product quality and/or to the routine it executes to generate an incentive offer structure. For example, if a target donor has a history of routinely "cheating" by making donations at unaffiliated facilities two weeks after making donations that are recorded by the computer 66, then the computer 66 may shift the incentive offer structure by two weeks into the future to circumvent the attempt to "cheat" the system.

An incentive offer routine according to the present disclosure may also be used to discourage blood donation on a particular date. For example, if the computer 66 implementing the routine determines that it is particularly likely for a target donor to have an adverse reaction to a blood donation being made on a particular date, the computer 66 may assign an incentive offer having a relatively low value or magnitude to that date, with other dates (namely, ones having a lower risk of adverse reaction) being associated with greater incentive offers. The likelihood of an adverse reaction may be best predicted based on historical data for the target donor (i.e., previous blood donations). For example, when a donor has participated in a series of blood donations, the computer 66 may record any adverse reactions experienced by the donor, including the type of reaction and its severity, the stage of a donation during which a reaction occurred, etc. This historical data may be used by the computer 66 to predict whether the donor is likely to have an adverse reaction when making a donation of a given future date (using any selected threshold of likelihood, such as a 50% chance of adverse reaction or an 80% chance of adverse reaction). When the likelihood of an adverse reaction is sufficiently great for a particular date, the computer 66 may assign an incentive offer having a relatively low value to that date or even assign no incentive offer to that date.

However, while historical data for a particular donor may be the best basis for predicting the likelihood of an adverse reaction, such historical data is not always available. In this situation, data from a larger population of blood donors (e.g., all of the donors at a particular blood draw site or geographical region, etc.) may be used by the computer 66 to generate an initial prediction model and incentive offer structure for a particular donor. For example, data from a larger population of blood donors may indicate that there is a 20% chance that an average donor will have an adverse reaction when donating blood a certain number of days after a first donation. The computer 66 may apply this likelihood of adverse reaction when generating a prediction model for a target donor and when generating an incentive offer structure based on the prediction model. If information has been recorded for a donor (e.g., age, weight, height, sex, ethnicity), that information may be used to refine the scope of the population used to predict the likelihood of an adverse reaction, by limiting the population to those donor having characteristics that are similar to the subject donor. Once the donor has made one or more donations, the initial model may be adjusted by the computer 66 in view of the donor's unique physiology.

This same approach may be employed by the computer 66 to discourage a target donor from attempting to make a blood donation on a date when it is especially likely that the donation will be deferred. An attempted donation may be deferred for any of a number of reasons, most typically related to a medical condition of the prospective donor, but for other reasons as well (e.g., if a donation site is not adequately staffed to accommodate all of the donors attempting to donate blood on a given day). The likelihood of a deferral may be best predicted based on historical data for the target donor (i.e., previous deferrals). When sufficient historical data is available, it may be used by the computer 66 to predict whether an attempted donation by the donor on a given future date is likely to be deferred (using any selected threshold of likelihood, such as a 25% chance of deferral or a 40% chance of deferral). When the likelihood of a deferral is sufficiently great for a particular date, the computer 66 may assign an incentive offer having a relatively low value to that date or even assign no incentive offer to that date.

However, while historical data for a particular donor may be the best basis for predicting the likelihood of a deferral, such historical data is not always available. In this situation, data from a larger population of blood donors (e.g., all of the donors at a particular blood draw site or geographical region, etc.) may be used by the computer 66 to generate an initial prediction model and incentive offer structure for a particular donor. For example, data from a larger population of blood donors may indicate that there is a 20% chance that an attempted blood donation will be deferred when donating blood a certain number of days after a first donation. The computer 66 may apply this likelihood of deferral when generating a prediction model for a target donor and when generating an incentive offer structure based on the prediction model. If information has been recorded for a donor (e.g., age, weight, height, sex, ethnicity), that information may be used to refine the scope of the population used to predict the likelihood of a deferral, by limiting the population to those donor having characteristics that are similar to the subject donor. Once the donor has made one or more donations, the initial model may be adjusted in view of the donor's unique physiology.

Furthermore, while historical data and data from a larger donor population may be useful in predicting the likelihood of deferral, there are other factors to be considered that are not accounted for in either type of data. For example, as noted above, logistical considerations (e.g., the number of available beds) may be relevant in predicting the likelihood of a deferral, with neither historical data for a target donor nor data gathered from a larger population being capable of accounting for such considerations. In an exemplary scenario, a blood donation facility may be aware of a change in the availability of blood separation devices 10 on a particular future date. This may include scheduled maintenance for a plurality of devices 10, rendering them unavailable, or the scheduled addition of one or more new devices 10, allowing for the blood draw facility to accept more donors. In these cases, the computer 66 may be provided with the relevant information and use the information when predicting the likelihood of deferral on a given date, followed by using that adjusted likelihood to provide an appropriate incentive offer for that date.

Additional factors may also be considered by the computer 66 when generating and/or modifying an incentive offer or offer structure. For example, the likelihood of a target donor accepting an incentive offer may be a relevant consideration. If historical data for the donor suggests that there is a low likelihood of an incentive offer being accepted, it may be advantageous for the computer 66 to increase the value or magnitude of an incentive offer to attempt to induce the donor to accept the offer. Conversely, if historical data for the donor suggests that there is a relatively high likelihood of an incentive offer being accepted, the computer 66 may determine whether to reduce the value or magnitude of the incentive offer so as to better allocate the resources of the blood donation facility.

The computer 66 that implements an incentive offer routine of the type described herein may be variously configured without departing from the scope of the present disclosure. While it is within the scope of the present disclosure for the controller 16 of an individual separation device 10 to implement the incentive offer routine, it may be advantageous for the routine to be an unsupervised algorithm implemented by a central computer or data management system or data processing system that communicates with a plurality of separation devices 10 and/or blood donation facilities. Such a central computer or data management system may record and store historical data for numerous target donors, generate suitable incentive offer structures for each donor, and transmit (or instruct one or more associated agents to transmit) the incentive offers to the donors, along with updating any previously issued incentive offers. The use of machine learning, neural networks, deep learning, and other advanced artificial intelligence techniques to gather, organize, and prioritize numerous data points and implement continually improving predictive models using such data points allows for individual incentive offer structures that are beneficial for both a target donor and the collector or blood donation facility.

Aspects

Aspect 1. A computer-based method of incentivizing blood donation, comprising: predicting the quality of a blood product produced from blood donated by a target donor on each of a plurality of dates; generating an incentive offer for the target donor to donate blood on at least one of said dates; and transmitting the incentive offer to the target donor, wherein the magnitude of each incentive offer depends at least in part on the predicted quality of the blood product produced from blood donated by the target donor on the corresponding date.

Aspect 2. The method of Aspect 1, wherein a plurality of incentive offers are generated and transmitted for a plurality of dates, and at least two of the incentive offers are different.

Aspect 3. The method of any one of the preceding Aspects, wherein each incentive offer further depends at least in part on a predicted likelihood of an adverse reaction to a blood donation occurring on the corresponding date.

Aspect 4. The method of any one of the preceding Aspects, wherein each incentive offer further depends at least in part on a predicted likelihood of a deferral of an attempted blood donation occurring on the corresponding date.

Aspect 5. The method of any one of the preceding Aspects, wherein each incentive offer is transmitted via at least one of email, text, telephone call, smart device application, and/or mail.

Aspect 6. The method of any one of the preceding Aspects, wherein an initial incentive offer structure is generated based at least in part on data from a population of a plurality of blood donors.

Aspect 7. The method of any one of the preceding Aspects, wherein an incentive offer for the target donor to donate blood on one of said dates is transmitted on a first date, and a modified version of said incentive offer for said date is generated and transmitted to the target donor at a later time during the first date or on a second date.

Aspect 8. The method of Aspect 7, wherein the modified version of said incentive offer is based at least in part on an intervening blood donation made by the target donor, a change in an expected supply of blood, a change in an expected demand for the blood product, and/or a change in personnel availability at a blood donation site.

Aspect 9. The method of any one of the preceding Aspects, further comprising alerting the target donor of the transmission of the incentive offer, wherein the target donor is only alerted of the transmission of the incentive offer when a value of the incentive offer exceeds a minimum threshold.

Aspect 10. The method of any one of the preceding Aspects, wherein each incentive offer further depends at least in part on a predicted likelihood of the target donor accepting the incentive offer and proceeding with a blood donation on the corresponding date.

Aspect 11. A computer-based method of incentivizing blood donation, comprising: predicting the likelihood of a target donor experiencing an adverse reaction to a blood donation on each of a plurality of dates; generating an incentive offer for the target donor to donate blood on at least one of said dates; and transmitting the incentive offer to the target donor, wherein the magnitude of each incentive offer depends at least in part on the predicted likelihood of the adverse reaction occurring on the corresponding date.

Aspect 12. The method of Aspect 11, wherein a plurality of incentive offers are generated and transmitted for a plurality of dates, and at least two of the incentive offers are different.

Aspect 13. The method of any one of Aspects 11-12, wherein each incentive offer further depends at least in part on the predicted quality of a blood product produced from blood donated by the target donor on the corresponding date.

Aspect 14. The method of any one of Aspects 11-13, wherein each incentive offer further depends at least in part on a predicted likelihood of a deferral of an attempted blood donation occurring on the corresponding date.

Aspect 15. The method of any one of Aspects 11-14, wherein each incentive offer is transmitted via at least one of email, text, telephone call, smart device application, and/or mail.

Aspect 16. The method of any one of Aspects 11-15, wherein an initial incentive offer structure is generated based at least in part on data from a population of a plurality of blood donors.

Aspect 17. The method of any one of Aspects 11-16, wherein an incentive offer for the target donor to donate blood on one of said dates is transmitted on a first date, and a modified version of said incentive offer for said date is generated and transmitted to the target donor at a later time during the first date or on a second date.

Aspect 18. The method of Aspect 17, wherein the modified version of said incentive offer is based at least in part on an intervening blood donation made by the target donor, a change in an expected supply of blood, a change in an expected demand for the blood product, and/or a change in personnel availability at a blood donation site.

Aspect 19. The method of any one of Aspects 11-18, further comprising alerting the target donor of the transmission of the incentive offer, wherein the target donor is only alerted of the transmission of the incentive offer when a value of the incentive offer exceeds a minimum threshold.

Aspect 20. The method of any one of Aspects 11-19, wherein each incentive offer further depends at least in part on a predicted likelihood of the target donor accepting the incentive offer and proceeding with a blood donation on the corresponding date.

Aspect 21. A computer-based method of incentivizing blood donation, comprising: predicting the likelihood of an attempted blood donation by a target donor being deferred on each of a plurality of dates; generating an incentive offer for the target donor to donate blood on at least one of said dates; and transmitting the incentive offer to the target donor, wherein the magnitude of each incentive offer depends at least in part on the predicted likelihood of the deferral occurring on the corresponding date.

Aspect 22. The method of Aspect 21, wherein a plurality of incentive offers are generated and transmitted for a plurality of dates, and at least two of the incentive offers are different.

Aspect 23. The method of any one of Aspects 21-22, wherein each incentive offer further depends at least in part on a predicted likelihood of an adverse reaction to a blood donation occurring on the corresponding date.

Aspect 24. The method of any one of Aspects 21-23, wherein each incentive offer further depends at least in part on the predicted quality of a blood product produced from blood donated by the target donor on the corresponding date.

Aspect 25. The method of any one of Aspects 21-24, wherein each incentive offer is transmitted via at least one of email, text, telephone call, smart device application, and/or mail.

Aspect 26. The method of any one of Aspects 21-25, wherein an initial incentive offer structure is generated based at least in part on data from a population of a plurality of blood donors.

Aspect 27. The method of any one of Aspects 21-26, wherein an incentive offer for the target donor to donate blood on one of said dates is transmitted on a first date, and a modified version of said incentive offer for said date is generated and transmitted to the target donor at a later time during the first date or on a second date.

Aspect 28. The method of Aspect 27, wherein the modified version of said incentive offer is based at least in part on an intervening blood donation made by the target donor, a change in an expected supply of blood, a change in an expected demand for the blood product, and/or change in personnel availability at a blood donation site.

Aspect 29. The method of any one of Aspects 21-28, further comprising alerting the target donor of the transmission of the incentive offer, wherein the target donor is only alerted of the transmission of the incentive offer when a value of the incentive offer exceeds a minimum threshold.

Aspect 30. The method of any one of Aspects 21-29, wherein each incentive offer further depends at least in part on a predicted likelihood of the target donor accepting the incentive offer and proceeding with a blood donation on the corresponding date.

It will be understood that the embodiments and examples described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A computer-based method of incentivizing blood donation, comprising:
    predicting a quality of a blood product produced from blood donated by a target donor on each of a plurality of dates;
    generating an incentive offer for the target donor to donate blood on at least one of said dates; and
    transmitting the incentive offer to the target donor, wherein the magnitude of each incentive offer depends at least in part on the predicted quality of the blood product produced from blood donated by the target donor on the corresponding date; and
    upon the target donor accepting the incentive offer for said at least one of said dates, executing a blood donation procedure for the target donor on said at least one of said dates using a blood donation system comprising a blood donation device and a fluid flow circuit, wherein the blood donation device includes a central processing unit or controller and a pump system, with the central processing unit or controller actuating the pump system during said blood donation procedure to draw blood from the target donor into the fluid flow circuit,
        the quality of the blood product produced from blood donated by the target donor on each of said plurality of dates is predicted by a central computer or data management system or data processing system, and
        the incentive offer is generated and transmitted by the central computer or data management system or data processing system, with the central computer or data management system or data processing system using artificial intelligence to generate the incentive offer.

2. The method of claim 1, wherein
    a plurality of incentive offers are generated and transmitted for a plurality of dates, and
    at least two of the incentive offers are different.

3. The method of claim 1, wherein each incentive offer further depends at least in part on a predicted likelihood of an adverse reaction to a blood donation occurring on the corresponding date and a predicted likelihood of a deferral of an attempted blood donation occurring on the corresponding date.

4. The method of claim 1, wherein an initial incentive offer structure is generated based at least in part on data from a population of a plurality of blood donors.

5. The method of claim 1, wherein
    an incentive offer for the target donor to donate blood on one of said dates is transmitted on a first date, and
    a modified version of said incentive offer for said date is generated and transmitted to the target donor at a later time during the first date or on a second date, with the modified version of said incentive offer being based at least in part on an intervening blood donation made by the target donor, a change in an expected supply of blood, a change in an expected demand for the blood product, and/or a change in personnel availability at a blood donation site.

6. The method of claim 1, further comprising alerting the target donor of the transmission of the incentive offer, wherein the target donor is only alerted of the transmission of the incentive offer when a value of the incentive offer exceeds a minimum threshold.

7. The method of claim 1, wherein each incentive offer further depends at least in part on a predicted likelihood of the target donor accepting the incentive offer and proceeding with a blood donation on the corresponding date.

8. A computer-based method of incentivizing blood donation, comprising:
    predicting a likelihood of a target donor experiencing an adverse reaction to a blood donation on each of a plurality of dates;
    generating an incentive offer for the target donor to donate blood on at least one of said dates;
    transmitting the incentive offer to the target donor, wherein the magnitude of each incentive offer depends at least in part on the predicted likelihood of the adverse reaction occurring on the corresponding date; and
    upon the target donor accepting the incentive offer for said at least one of said dates, executing a blood donation procedure for the target donor on said at least one of said dates using a blood donation system comprising a blood donation device and a fluid flow circuit, wherein the blood donation device includes a central processing unit or controller and a pump system, with the central processing unit or controller actuating the pump system during said blood donation procedure to draw blood from the target donor into the fluid flow circuit,
        the likelihood of the target donor experiencing the adverse reaction on each of said plurality of dates is predicted by a central computer or data management system or data processing system, and
        the incentive offer is generated and transmitted by the central computer or data management system or data processing system, with the central computer or data management system or data processing system using artificial intelligence to generate the incentive offer.

9. The method of claim 8, wherein
    a plurality of incentive offers are generated and transmitted for a plurality of dates, and
    at least two of the incentive offers are different.

10. The method of claim 8, wherein each incentive offer further depends at least in part on a predicted likelihood of a deferral of an attempted blood donation occurring on the corresponding date.

11. The method of claim 8, wherein an initial incentive offer structure is generated based at least in part on data from a population of a plurality of blood donors.

12. The method of claim 8, wherein
    an incentive offer for the target donor to donate blood on one of said dates is transmitted on a first date, and
    a modified version of said incentive offer for said date is generated and transmitted to the target donor at a later time during the first date or on a second date, with the modified version of said incentive offer being based at least in part on an intervening blood donation made by the target donor, a change in an expected supply of blood, a change in an expected demand for the blood product, and/or a change in personnel availability at a blood donation site.

13. The method of claim 8, further comprising alerting the target donor of the transmission of the incentive offer, wherein the target donor is only alerted of the transmission of the incentive offer when a value of the incentive offer exceeds a minimum threshold.

14. The method of claim 8, wherein each incentive offer further depends at least in part on a predicted likelihood of the target donor accepting the incentive offer and proceeding with a blood donation on the corresponding date.

15. A computer-based method of incentivizing blood donation, comprising:
predicting a likelihood of an attempted blood donation by a target donor being deferred on each of a plurality of dates;
generating an incentive offer for the target donor to donate blood on at least one of said dates;
transmitting the incentive offer to the target donor, wherein the magnitude of each incentive offer depends at least in part on the predicted likelihood of the deferral occurring on the corresponding date; and
upon the target donor accepting the incentive offer for said at least one of said dates, executing a blood donation procedure for the target donor on said at least one of said dates using a blood donation system comprising a blood donation device and a fluid flow circuit, wherein
the blood donation device includes a central processing unit or controller and a pump system, with the central processing unit or controller actuating the pump system during said blood donation procedure to draw blood from the target donor into the fluid flow circuit,
the likelihood of the deferral on each of said plurality of dates is predicted by a central computer or data management system or data processing system, and the incentive offer is generated and transmitted by the central computer or data management system or data processing system, with the central computer or data management system or data processing system using artificial intelligence to generate the incentive offer.

16. The method of claim 15, wherein
a plurality of incentive offers are generated and transmitted for a plurality of dates, and
at least two of the incentive offers are different.

17. The method of claim 15, wherein an initial incentive offer structure is generated based at least in part on data from a population of a plurality of blood donors.

18. The method of claim 15, wherein
an incentive offer for the target donor to donate blood on one of said dates is transmitted on a first date, and
a modified version of said incentive offer for said date is generated and transmitted to the target donor at a later time during the first date or on a second date, with the modified version of said incentive offer being based at least in part on an intervening blood donation made by the target donor, a change in an expected supply of blood, a change in an expected demand for the blood product, and/or a change in personnel availability at a blood donation site.

19. The method of claim 15, further comprising alerting the target donor of the transmission of the incentive offer, wherein the target donor is only alerted of the transmission of the incentive offer when a value of the incentive offer exceeds a minimum threshold.

20. The method of claim 15, wherein each incentive offer further depends at least in part on a predicted likelihood of the target donor accepting the incentive offer and proceeding with a blood donation on the corresponding date.

* * * * *